(12) United States Patent
Stutzmann et al.

(10) Patent No.: US 7,976,762 B2
(45) Date of Patent: Jul. 12, 2011

(54) METHOD FOR MICROSTRUCTING POLYMER-SUPPORTED MATERIALS

(76) Inventors: Natalie Stutzmann, Zurich (CH); Theodorus Tervoort, Zurich (CH); Cees Bastiaansen, Montfort (NL); Paul Smith, Zurich (CH)

(*) Notice: Subject to any disclaimer, the term of this patent is extended or adjusted under 35 U.S.C. 154(b) by 1751 days.

(21) Appl. No.: 10/219,824

(22) Filed: Aug. 16, 2002

(65) Prior Publication Data
US 2003/0062635 A1    Apr. 3, 2003

Related U.S. Application Data (63) Continuation of application No. PCT/US01/05181, filed on Feb. 16, 2001.

(60) Provisional application No. 60/182,919, filed on Feb. 16, 2000.

(51) Int. Cl.
*B29C 43/20* (2006.01)

(52) U.S. Cl. .......... 264/320; 264/163; 264/293
(58) Field of Classification Search ............ 264/1.1, 264/1.7, 2.7, 163, 293
See application file for complete search history.

(56) References Cited

U.S. PATENT DOCUMENTS

| | | | |
|---|---|---|---|
| 5,073,237 A | 12/1991 | Bacher et al. | |
| 5,143,672 A | 9/1992 | Kuwahara | |
| 5,512,161 A | 4/1996 | Dinglreiter et al. | |
| 5,642,015 A * | 6/1997 | Whitehead et al. | 310/309 |
| 5,795,519 A | 8/1998 | Bacher et al. | |
| 5,834,037 A | 11/1998 | Wu | |
| 6,120,710 A * | 9/2000 | Makansi | 264/1.34 |

* cited by examiner

*Primary Examiner* — Mathieu D. Vargot
(74) *Attorney, Agent, or Firm* — Pillsbury Winthrop Shaw Pittman LLP (57) ABSTRACT

A method is provided for microstructuring polymer-supported materials. Also provided are microstructured objects obtained with this method. The microstructured objects are suitable for use, among other things, as light polarizers, transflectors, microelectrode arrays, and liquid-crystal alignment layers.

1 Claim, 4 Drawing Sheets

Fig. 1A

Fig. 1B multi-structured master embossed, three-layer film

Fig. 4

METHOD FOR MICROSTRUCTING POLYMER-SUPPORTED MATERIALS

CROSS REFERENCE TO RELATED APPLICATIONS

This application is a continuation application based on PCT/US01/05181, filed Feb. 16, 2001, and which further claims priority from U.S. Provisional Application No. 60/182,919, filed Feb. 16, 2000. These applications, in their entirety, are incorporated herein by reference.

FIELD OF THE INVENTION

The invention relates to a method for microstructuring polymer-supported materials and microstructured objects obtained therewith, suitable for use, for instance, as light polarizers, transflectors, microelectrode arrays, or liquid-crystal alignment layers and combinations thereof.

BACKGROUND OF THE INVENTION

Microstructuring of materials is of critical importance for manufacturing of a wide variety of advanced electronic, optical and mechanical devices ranging from displays to biosensors. For this purpose a number of methods have been developed, including lithographic techniques such as photo-, x-ray- and electron-beam lithography, microcontact-printing, micromolding and cold-welding. See, for instance, U.S. Pat. Nos. 4,886,627; 4,997,522; 5,512,131; 5,810,945; 6,020,107; 6,074,513; 6,159,832; 6,168,897; 6,177,354; and 6,180,239. The main disadvantage of the most of these techniques is that they often are of restricted applicability, involve a multitude of elaborate and cumbersome processing steps, or frequently require aggressive chemistry. Hence a need continues to exist for a simple, less costly method that permits reliable production of microstructured objects.

SUMMARY OF THE INVENTION

It is an object of the present invention to provide a microstructuring method according to which a wide variety of materials can be structured on a wide variety of polymer supports including semi-crystalline and amorphous polymers.

It is a further object of the present invention to provide a microstructuring method according to which materials can be structured on polymer supports, which are in their solid-state.

It is a further object of the present invention to provide a microstructuring method according to which microstructured objects can be produced.

It is a further object of the present invention to provide microelectrodes produced according to the present microstructuring method.

It is a further object of the present invention to provide optical components produced according to the present microstructuring method.

Also, it is an object of the present invention to provide a microstructuring method to produce microstructured objects that can be used as alignment layer and as microelectrodes, polarizers, transflectors, or combinations thereof.

It is a further object of the present invention to provide a microstructuring method to produce objects that can be used as crystallization templates.

DETAILED DESCRIPTION OF THE INVENTION AND PREFERRED EMBODIMENTS

The present invention provides a method in which at least one layer 2a is microstructured on a polymer support 3. These layers 2a can be metals, polymers, ceramics, inorganics and organics, and combinations thereof. The support 3 can be a semi-crystalline or amorphous polymer. By pressing a master 1 with desired features into the polymer support 3, the layers 2a are microstructured and wholly or partly cut into well-defined supported micro-features 2b. The master 1 can be pressed into the multilayer structure, for instance, by an embossing technique, hot embossing, roller hot embossing, stamping, and the like. The layers 2a can be structured one or multiple times. Also, unsupported microstructures can be obtained; the polymer support 3 can, for instance be dissolved or burned off after the structuring process.

The Master

In one embodiment, the master 1 comprises sharp, protruding features, such as saw-tooth-type structures (FIGS. 1a, b), spikes, and the like. Preferably, there is low friction between master 1 and polymer support 3. Suitable masters for use in the process according to the present invention can be made by a variety of methods known in the art, including, but not limited to lithography, electroplating, electroforming and the like. The process of their manufacturing and the material of the masters are not critical, provided that the masters are sufficiently hard and capable of cutting through the layers 2a. Characteristic dimensions of the features of the masters, such as the spacing between two protruding edges, can be in the range between 1 mm and 1 nm. In one embodiment, these characteristic dimensions are between about 100 µm and 5 nm, and in a further embodiment between 10 µm and about 10 nm.

Figure 1A:
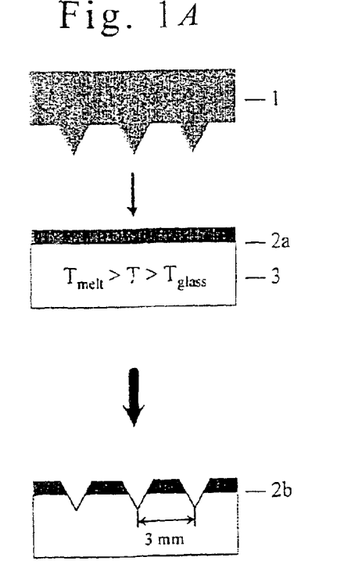
FIGS. 1a,b are schematic presentations (side-view) of the microstructuring process according to one embodiment of the present invention.
Figure 1B:
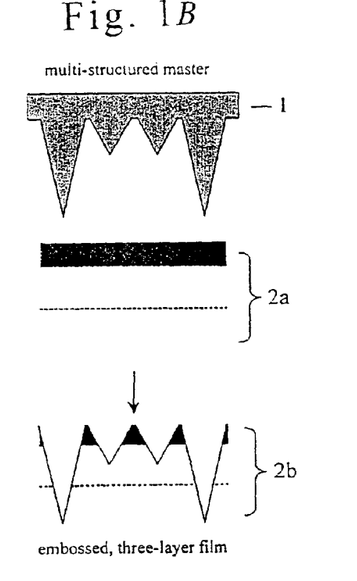

The depth of the features of the masters generally exceeds the thickness of the layer or layers 2a that are to be cut according to the present invention (FIGS. 1a,b). The pattern of the masters can be varied and is dictated by the envisioned use of the final object. For instance, if the process according to the present invention is employed to manufacture simple wire-grid polarizers, a master of regularly spaced, sharp line-shaped edges that are separated by about half of the wavelength of the light that is to be polarized, can be used. Masters for different objects can readily be designed by those skilled in the art of microfabrication.

The Polymer Support

The microstructuring process of the layers 2a according to the present invention can be carried out onto a polymer support 3. A great variety of polymers can be used, including, but not limited to polyolefins, such as polyethylene, isotactic polypropylene, nylons, polyesters, such as poly(ethylene terephthalate), fluorinated polymers, such as perfluorinated ethylene-propylene copolymers, poly(tertafluoroethylene) and the like, poly(oxymethylene), poly(vinyl alcohol), polystyrene, polyacrylates, such as poly(methyl methacrylate), polycarbonate, poly(vinylphenol), conducting polymers, such as polyaniline, poly(ethylene dioxythiophene), poly(alkyl thiophenes), substituted or unsubstituted poly(phenylene vinylene)s, and the like. The criteria for selection of the support polymer depend on the method of applying the layer or layers 2a that are to be cut and the adhesion thereto, and the desired optical properties, such as transparency or refractive index, physico-chemical properties, such as polarity, hydrophobicity, electrical properties, such as conductivity or dielectric constant, and the like, which are determined by the end use of the structured objects. Generally, good adhesion between the substrate and the layers 2a is preferred. Depending on the envisioned application of the microstructured object, the substrate may or may not be an oriented polymer. In one embodiment of the method according to the present invention, the polymer substrate 3 is in a deformable solid state, and not brittle under the conditions where the microstructuring process is carried out.

The Layers

The layer or layers 2a that are to be microstructured according to the present invention may consists of, or comprise a great variety of materials and materials combinations, including, but not limited to metals, polymers, ceramics, inorganics and organics. Selection of the appropriate material or materials is dictated by the envisioned end use of the microstructured object. For instance, for the fabrication of microelectrodes, metals, such as gold, silver and aluminum, conducting polymers, such as polyanilines and poly(ethylene dioxythiophene)s, and conducting ceramics, for instance indium tin oxide, are preferred.

The thickness of the layers according to the present invention may vary greatly. Generally, the thickness exceeds the grain size of the constituent material. In one embodiment, the layer thickness is between 1 nm and 100 µm. In another embodiment, the layer thickness is between 5 nm and 10 µm. In another embodiment, the layer thickness is between about 10 nm and 1 µm. The selection of the particular thickness first of all is dictated by the envisioned function and end use of the microstructured object. It is contemplated within the scope of the present invention that the microstructured object comprises a multitude of layers of similar or dissimilar materials that provide a number of different functions and properties. It is also envisioned that one or more of these layers have the same or different microstructures, which may be effected by proper design of the master or by multiple structuring according to one embodiment of the present invention.

The layers may be applied to the polymer substrate 3, with a variety of methods. Selection of the appropriate method to deposit the layers is depending on the material that is to be formed into the layer or layers 2a, and the compatibility and interactions with the substrate of the material and the method of application. For instance, materials may be applied from solution by spin- or drop casting, dip-coating, doctor blading, screen printing, ink-jet printing, micro-contact printing, and the like; by melt-compression molding, evaporation, sputtering, stamping, and the like; by forming self-assembled layers, Langmuir-Blodgett techniques, and the like.

The Process

In one embodiment of the present microstructuring process, the polymer substrate 3 is in its solid state. Accordingly, for amorphous polymers the method is carried out around the glass transition temperature, $T_g$. The latter temperatures generally are well known and can be found for instance in the Polymer Handbook (Eds. J. Brandrup, H. Immergut, E. A. Grulke; John Wiley & Sons; New York, 1999), or can readily be determined according to standard thermal analysis methods. In one embodiment, the microstructuring process according to the present invention is carried out in a temperature range from about 50° C. below to about 50° C. above $T_g$. In another embodiment, the microstructuring process according to the present invention is carried out in a temperature range from about 40° C. below to about 40° C. above that transition. In another embodiment, the microstructuring process according to the present invention is carried out in a temperature range from about 25° C. below to about 25° C. above $T_g$. For semi-crystalline polymers the microstructuring method according to the present invention is carried out in the temperature regime between about the glass transition temperature, $T_g$. and the melting temperature, $T_m$. The latter temperatures generally are also well known and can also be found for instance in the above-mentioned Polymer Handbook or can readily be determined according to standard thermal analysis methods. In one embodiment, the microstructuring process is carried out in a temperature range from about 50° C. below $T_g$ to 1° C. below $T_m$, and in another embodiment from about 25° C. below $T_g$ to 2° C. below $T_m$. In another embodiment, the microstructuring process is carried out in a temperature range from $T_g$ to about 5° C. below $T_m$. Other processing parameters, such as the load that is applied onto the master and time period during which it is applied, are less critical and are readily adjusted to ensure that the desired penetration of the master through one or more of the layers 2a is effected.

The microstructuring process may be repeated multiple times, so that, for instance, complex structures can be obtained with a relatively simple master, or that elaborate structures created with different masters can be combined. For example, microcutting twice with a simple line-shaped master can yield checker-board or cross-hatched patterns when the master is rotated between the sequential cutting steps.

It is also contemplated that the substrate 3, or one or more of the layers 2a, or a combination thereof, are removed or modified in whole or in part, between steps, or after completion of the microstructuring process by dissolution, thermal treatment, chemical and mechanical means, and the like. Additionally, it is contemplated that after the microstructuring process, the object obtained may be further modified, for instance, by mechanical deformation, heat setting, by applying one or more additional layers, coatings, encapsulation, and the like. Also, in one embodiment of the present invention, the microstructured layer or layers 2b may be transferred onto other substrates or functional supports.

Applications and Objects

It will be apparent to those ordinarily skilled in the art that the microstructuring process according to the present invention can be widely applied and may yield numerous objects in a great variety of shapes and forms, for use in a broad spectrum of applications. As pointed out in the preceding sections, it is the particular selection of materials, number of layers and their thicknesses, master geometries, number microstructuring steps and post-treaments that determine the functions of the objects obtained.

Without any intention to restrict the applicability of the method of the present invention, illustrative objects that can be produced according to it include micro-electrodes and arrays thereof, optical filters, polarizers, polarization-dependent color filters, transflectors, and the like. In addition, the present invention permits simple manufacturing of multifunctional items and layers that combine the properties of one or more of the above-mentioned objects and those of layers used, for example in certain displays, to orient liquid crystals (such as the cumbersomely prepared rubbed polyimide layers). The present method also allows simple manufacturing of complex security features, such as multi-functional holograms. Additionally, it is envisioned that microstructured objects according to the present invention can be used to induce patterned growth of materials, either through their particular geometry, patterned polarity or wettability, or their ability to provide high electrical or magnetic fields across predetermined patterns.

The following specific examples are presented to illustrate the invention and are not to be construed as any limitations thereon.

EXAMPLES

Examples 1

A microstructured object was prepared in accordance with an embodiment of this invention. The object prepared comprised a microcut gold (Au) layer (about 50 nm thin) onto a poly(tetrafluoroethylene-co-hexafluoropropylene) film (FEP) (125-175 μm thick).

Figure 2:
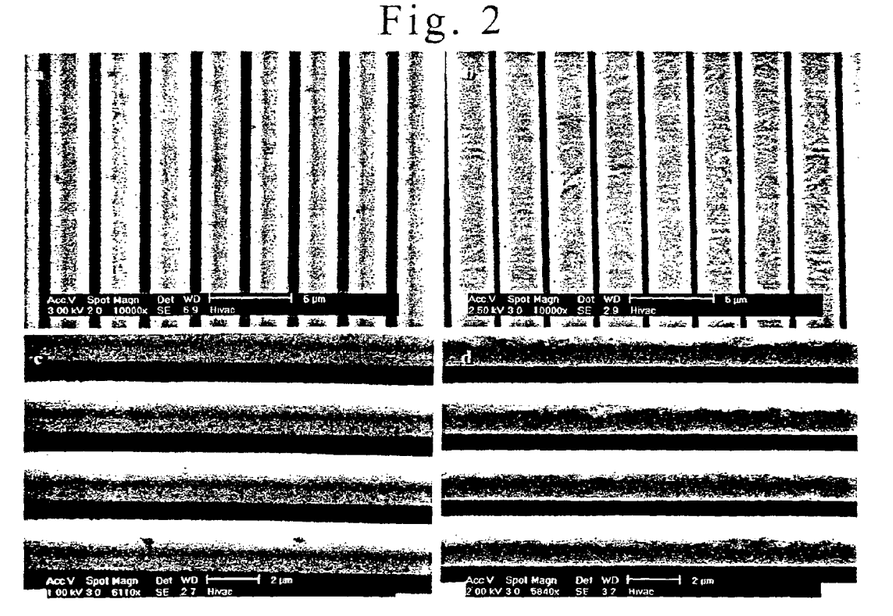
FIG. 2 shows environmental scanning electron (ESE) micrographs of microstructured objects that were obtained with the microcutting process according to one embodiment of the present invention.

The FEP substrate (TEFLON® FEP 100; DuPont Fluoroproducts, Geneva, Switzerland) was prepared by standard melt-compression molding of a FEP granulate at 330° C. applying a load of 2.5 kg for 5 min. For this purpose, a Tribotrak pressing apparatus (DACA Instruments, Santa Barbara, Calif., USA) was employed. A metallic layer was then applied onto the FEP film by evaporation of gold (99.99% Au wire, Ø=2 mm; Balzers AG, Balzers, Liechtenstein) using a MED-020 instrument (BAL-TEC, Balzers, Liechtenstein) operated at $1\times10^{-5}$ mbar. The thickness of this Au layer was about 50 nm. Subsequently, the bilayer (50 nm Au/FEP) film, which was supported by a glass slide, was embossed at 200° C. with a TGG01 Ultrasharp calibration grating (NT-MTD, Moscow, Russia; http://nt-mdt.adp-group.com/grating.htm) applying a load of 7.5 kg for 5 min. After 5 min, heating was stopped and the sample was allowed to cool down to room temperature with the load still being applied to the master and sample. In this way, a microstructured object in accordance with an embodiment of this invention comprised of regular and well-defined gold microstructures onto the FEP substrate was obtained, as the environmental scanning electron micrograph (taken with Philips FEG E-SEM XL30) in FIG. 2a demonstrates. Other processing conditions also have been shown to yield satisfactory results. Generally, shorter processing times can be used at higher loads, and lower loads can be used at higher temperatures.

Example 2

Another microstructured object was prepared in the same way as in Example 1, but now a high-density polyethylene substrate (HDPE) (125-175 μm thick) (Stamylan HD 7048; DSM, Heerlen, The Netherlands) was used instead of the FEP film. The HDPE substrate was obtained—analogously to the FEP films—by compression-molding of a HDPE granulate at 180° C. applying a load of 1 kg for 5 min. Embossing of the bilayer (50 nm Au/HDPE) system was carried out at 100° C. applying a load of 7.5 kg for 5 min with subsequent cooling (under load) to room temperature, whereupon the gold layer was microcut as the E-SEM photomicrograph in FIG. 2b illustrates. Other processing conditions also have been shown to yield similarly satisfactory results.

Thus, microstructured objects in accordance with an embodiment of this invention comprised of gold microstructures onto apolar, semi-crystalline polymers other than FEP, such as HDPE, can also be obtained utilizing the microcutting technique described in one embodiment of this invention.

Example 3

Another microstructured object was prepared in the same way as in Example 1, but now a poly(vinyl alcohol) (PVA) substrate (125-175 μm thick) (weight-average molecular weight $M_w \approx 100$ kg/mol; Aldrich Chemical Company, Milwaukee, USA) was used instead of the FEP film. The PVA film was obtained by casting a 1 wt % solution of PVA in deionized water into a plastic petri-dish and subsequent drying for 48 hrs at 50° C. Embossing of the bilayer (50 nm Au/PVA) system was carried out at 150° C. applying a load of 7.5 kg for 5 min with subsequent cooling (under load) to room temperature. Other processing conditions have been shown to also yield satisfactory results.

Thus, microstructured objects in accordance with an embodiment of this invention comprised of gold microstructures onto polar semi-crystalline polymers, such as PVA, can also be obtained utilizing the microcutting technique described in one embodiment of this invention.

Examples 4 and 5

Two other microstructured objects were prepared in the same way as in Example 2, but now Au layers of a thickness of about 20 nm (for Example 4) and 100 nm (for Example 5) were evaporated onto HDPE films. Also, the latter were plasma-treated before the gold was applied. The oxygen-plasma treatment was carried out with a RF-plasma cleaner (PDC-32G, Harrick Scientific Corporation, Ossining, N.Y., USA).

Thus, microcutting of Au layers of a broad range of thicknesses is feasible on HDPE substrates utilizing the microcutting technique described in one embodiment of this invention, yielding microstructured objects in accordance with an embodiment of this invention.

Examples 6 and 7

Two other microstructured objects were prepared in the same way as in Example 3, but now Au layers of a thickness of about 20 nm (Example 6; E-SEM photomicrograph in FIG. 2c) and 100 nm (Example 7) were evaporated onto PVA films. The latter were plasma-treated before the gold was applied as described for the HDPE films in Example 4 and 5.

Thus, microcutting of Au layers of a broad range of thicknesses is feasible on PVA substrates utilizing the microcutting technique described in one embodiment of this invention yielding microstructured objects in accordance with an embodiment of this invention.

Examples 8-10

Other microstructured object were prepared in the same way as in Example 1, but now an amorphous polymer, polystyrene (PS) ($M_w \approx 230$ kg/mol; Aldrich Chemical Company, Milwaukee, USA) was used instead of the FEP. Gold layers of a thickness of about 10 nm (Example 8), 50 nm (Example 9) and 100 nm (Example 10; E-SEM photomicrograph in FIG. 2d) were evaporated onto the PS substrates. The latter were obtained by compression-molding of a PS granulate at 180° C., applying a load of 2.5 kg for 5 min, yielding films of a thickness of 125-175 μm. Embossing of the bilayer systems (10 nm Au/PS, 50 nm Au/PS, 100 nm Au/PS) was carried out at 100° C. applying a load of 10 kg for 1 hr with subsequent cooling (under load) to room temperature. Other processing conditions also have been shown to yield satisfactory results.

Thus, microstructured objects in accordance with an embodiment of this invention comprised of gold microstructures of a broad range of thicknesses onto amorphous polymers, such as PS, can also be obtained utilizing the microcutting technique described in one embodiment of this invention.

Example 11-16

To illustrate that also other metal layers can be microcut utilizing the microcutting technique described in one embodiment of this invention, the following microstructured objects were prepared:

One object (Example 11) was produced in the same way as in Example 1, but now a gold/palladium (Au/Pd) layer of about 20 nm thickness was evaporated onto the FEP film. For the evaporation, an Au/Pd wire (80:20 wt %, Ø=0.2 mm; BAL-TEC, Balzers, Liechtenstein) was utilized.

Another microstructured object (Example 12) was obtained as described in Example 3, but before evaporating the Au layer an additional chromium (Cr) layer of about 5 to 10 nm thickness was applied by evaporation of Cr granulates (99.6%, Ø=1.5-3.5 mm; Balzers AG, Balzers, Liechtenstein).

Two microstructured objects (Example 13 and 14) were prepared in the same way as described in Examples 9 and 10, but now silver (Ag) layers were microcut. The latter were of a thickness of about 50 nm (in case of Example 13) and 100 nm (in case of Example 14). For the evaporation, an Ag wire (99.99%, Ø=1 mm; Balzers AG, Balzers, Liechtenstein) was utilized.

Another microstructured object (Example 15) was obtained as described in Example 2, but now an aluminum (Al) layer of about 20 nm thickness was applied onto the HDPE film by evaporation of Al granulates (99.9%, Ø=0.2-0.7 mm; Balzers AG, Balzers, Liechtenstein) employing a Balzers BAE 370 coating system (Balzers AG, Balzers, Liechtenstein) operated at 1.3× $10^{-6}$ mbar.

Another microstructured object in accordance with an embodiment of this invention (Example 16) was obtained by embossing commercially available poly (ethylene terephthalate) (PET) films, metallized with aluminum (Al layer thickness: about 35 nm), purchased from Goodfellow Cambridge Limited (Cambridge, England). Microcutting of the metallized PET film was carried out at 80° C. applying a load of 10 kg for 1 hr with subsequent cooling (under load) to room temperature. Other processing conditions also have been shown to yield satisfactory results.

Thus, microstructured objects in accordance with an embodiment of this invention comprised of other metallic microstructures than gold onto various polymeric substrates, such as FEP, PVA, PET and PS films, can also be obtained utilizing the microcutting technique described in one embodiment of this invention.

Example 17-20

Figure 3:
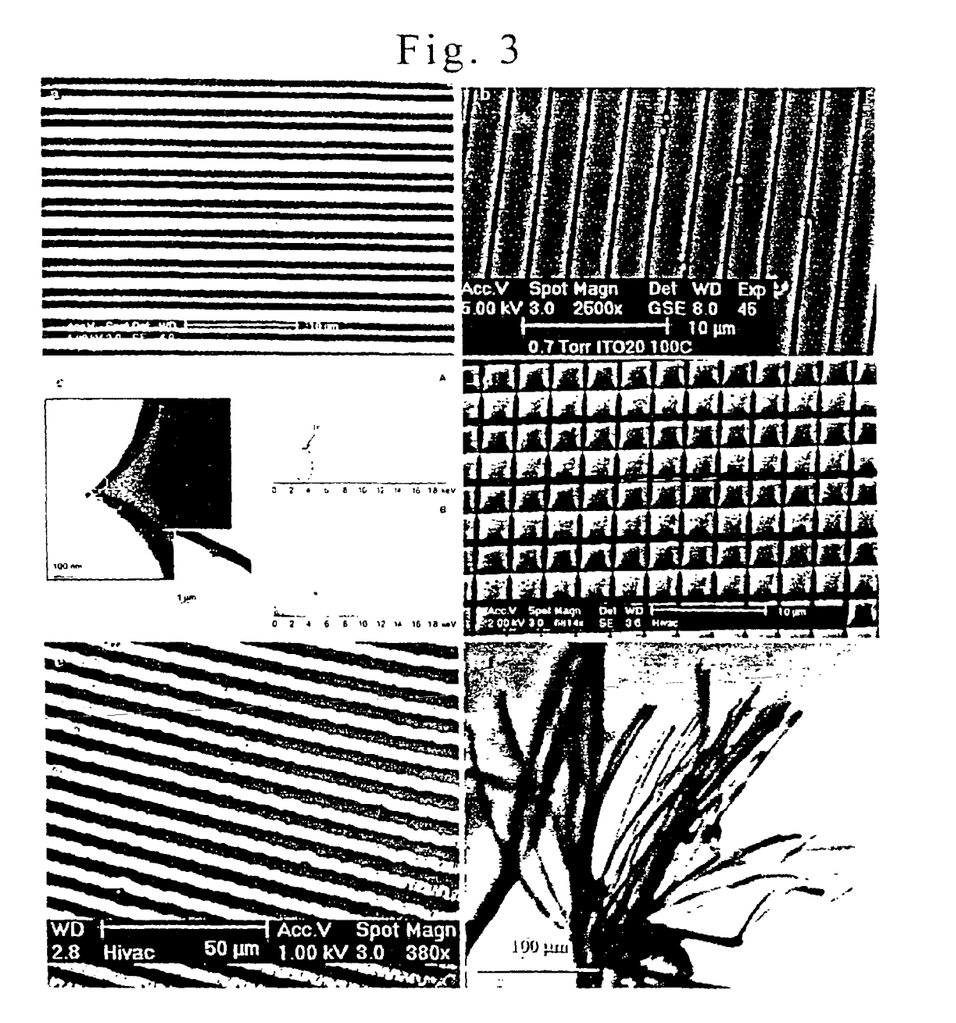
FIG. 3 shows various micrographs of other microstructured objects that were obtained with the microcutting process according to one embodiment of the present invention.

To illustrate that also polymeric layers can be microcut utilizing the present technique described in one embodiment of this invention, prepared were the following microstructured objects, which comprised a microcut poly(3,4-ethylene dioxythiophene) (PEDOT) layer (about 80 nm thick) onto various polymeric substrates of a thickness of about 2 to 3 μm:

Microstructured objects according to one embodiment of the present invents were produced by first spin-casting PS ($M_w$≈105 kg/mol; Aldrich Chemical Company, Milwaukee, USA) (Example 17), poly(methyl methacrylate) (PMMA) ($M_w$≈120 kg/mol; Aldrich Chemical Company, Milwaukee, USA) (Example 18) and poly (vinylphenol) PVP ($M_w$≈20 kg/mol; Aldrich Chemical Company, Milwaukee, USA) (Example 19) onto glass slides that were cleaned by sonication sequentially in ultra-pure water, actone and isopropanol. PS was cast from a 15wt % and PMMA from a 20 wt % solution in cyclopentane; PVP substrates were cast from a 30 wt % solution in propylene-glycol-methyl-ether-acetate. Subsequently, the films were placed over night in a vacuum oven at 70° C. to remove remaining solvent. The surfaces of these polymer films were then oxygen-plasma treated for 18 sec at 250 Watt. Then, PEDOT protonated with poly(styrene sulfonic acid) (PSS) was spin-cast onto the polymer films (2000 rpm, 60 sec) yielding films of around 80 nm thickness. The aqueous PEDOT/PSS solution was supplied by Bayer AG (Leverkusen, Germany). Microstructuring of the bilayer systems (PEDOT/PS, PEDOT/PMMA, PEDOT/PVP) was performed as described in Example 1 under the following conditions: PEDOT/PS: 100° C., 1 hr, 10 kg (Example 17); PEDOT/PMMA: 105° C., 1 hr, 10 kg (Example 18; E-SEM photomicrograph in FIG. 3a); PEDOT/PVP: 150° C., 1 hr, 10 kg (Example 19).

Other processing conditions also have been shown to yield satisfactory results.

Another microstructured polymer/polymer object (Example 20) was obtained as described in Example 17-19, but a compression-molded HDPE substrate was used instead of spin-cast ones. The HDPE film was obtained as described in Example 2 and embossing of the PEDOT/HDPE system was also performed as described in Example 2.

Thus, microstructured objects in accordance with an embodiment of this invention comprised of microcut polymeric microstructures onto various polymers, such as PS, PMMA, PVP and HDPE, can also be obtained utilizing the microcutting technique described in one embodiment of this invention.

Example 21-23

To illustrate that also inorganic, ceramic layers can be microstructured utilizing the microcutting technique described in one embodiment of this invention, indium tin oxide (ITO) layers of a thickness of 10 nm (Example 21), 15 nm (Example 22) and 20 nm (Example 23) were microcut on commercially available PET films (Mylar®, DuPont, USA). The E-SEM photomicrograph in FIG. 3b and transmission electron micrograph and energy-dispersive X-ray microanalysis in FIG. 3c of a cross-section of a microstructured ITO layer (20 nm thin) on PET demonstrate that the ITO layer is microcut: in region A, indium was detected whereas in region B, no indium was found. The PET films were of a thickness of about 100 μm. The ITO layers were applied onto these PET films by DC magnetron sputtering at 20 nm/min using a Leybold Z650 (Leybold Heraeus GmbH, Cologne, Germany) provided with a 8" target. Microstructuring of the two ITO/PET systems were performed as described in Example 2, but at 100° C. applying 10 kg for 1 hr.

Thus, microstructured objects in accordance with an embodiment of this invention comprised of microcut inorganic, ceramic microstructures onto polymer substrates can also be obtained utilizing the microcutting technique described in one embodiment of this invention.

Examples 24

Another microstructured object was prepared in the same way as in Example 21, but before evaporating the ITO layer, now an additional silicon oxide ($SiO_2$) layer was applied by RF sputtering at a rate of 7 nm/min using a Balzers Vanguard (Balzers AG, Balzers, Liechtenstein) provided with an 8" target. Microstructuring was then performed at 130° C. under a load of 10 kg for 1 hr.

Thus, microcutting of multilayer systems, even when using layers of intrinsically brittle materials, such as $SiO_2$, is feasible utilizing the microcutting technique described in one embodiment of this invention yielding microstructured objects in accordance with an embodiment of this invention.

Examples 25 and 26

Two other microstructured object were prepared in the same way as in Example 7 (Example 25; E-SEM photomicrograph in FIG. 3d) and Example 23 (Example 26), but after the first microstructuring step, the obtained microstructured object was microstructured for a second time, whereby the master was rotated by 90°. In this second patterning step, the same embossing parameters were used except that a lower load was employed (2.5 kg for Example 25; 5 kg for Example 26) than in the first embossing step.

This example demonstrates that multiple-microcutting is feasible utilizing the microcutting technique described in one embodiment of this invention, yielding microstructured objects in accordance with an embodiment of this invention that can comprise more complex features then the original master.

Examples 27 and 28

Two other microstructured object were prepared in the same way as in Example 7 (Example 27; E-SEM photomicrograph in FIG. 3e) and Example 23 (Example 28), but now, after the first embossing/microcutting step, the resultant microstructured objects were drawn in a Miniature Materials Tester (Minimat 2000; Rheometric Scientific GmbH, Munich, Germany) to about 2 times their original length.

Thus, microstructured objects, which were obtained with the microcutting technique described in one embodiment of this invention, can be deformed (e.g. drawn) after the embossing/microcutting step, what may be a desirable possibility, for instance, to modify spacings between the microcut features.

Examples 29

Unsupported microstructures according to one embodiment of the present invention were prepared by first preparing a microstructured object as described in Example 22, where now, subsequently, the PET substrate was dissolved in hexafluoro-2propanol, which yielded ITO "micro-"wires, as the optical micrograph in FIG. 3f illustrates (Leica DMRX, transmission, Leica AG, Glattbrugg, Switzerland).

Thus, as this example demonstrates, it is feasible to produce unsupported microstructures utilizing the microcutting technique described in one embodiment of this invention when, for instance, the support is removed by dissolution.

Example 30

Another microstructured object was prepared in the same way as in Example 1, but after microstructuring the metal layer, a pre-polymeric liquid that consisted of 1 ml monomer mixture (41.3 wt % Epon 812, 54 wt % Dibutylphthalate, 4.7 wt % Durcupan ACM), 1 ml hardener (DDSA) and 5 drops of accelerator (DMP30) (all from Fluka, Buchs, Switzerland), was poured on the microstructured object and, subsequently, cured at 60 ° C. for 24 hours. Then, the FEP substrate was peeled off the cured Epon with sharp tweezers. In this process, the microcut gold layer adhered to the Epon layer and, thus, was transferred from the FEP substrate.

Thus, as this example demonstrates, it is feasible to transfer the microcut microstructures produced with the technique described in one embodiment of this invention to other supports.

Examples 31-33

Other microstructured objects were prepared as described in Examples 16, 20 and 22. Their electrical properties were measured with a Metex® M-3610 digital multimeter (CE-BIT ELEKTRONIK AB, Göteborg, Sweden). The structures were found to have a resistance parallel to the microcut metal wires of about 30 Ω (Al/PET system; Example 31), 20 kΩ (ITO/PET system; Example 32) and 200 kΩ (PEDOT/HDPE system; Example 33). Perpendicular to the wires, a resistance virtually identical to that of the insulating PET film was measured for all three systems.

Thus, as these examples demonstrate, it is feasible to produce metallic, polymeric and inorganic, nonmetallic microelectrodes with the microcutting technique described in one embodiment of this invention.

Examples 34

Figure 4:
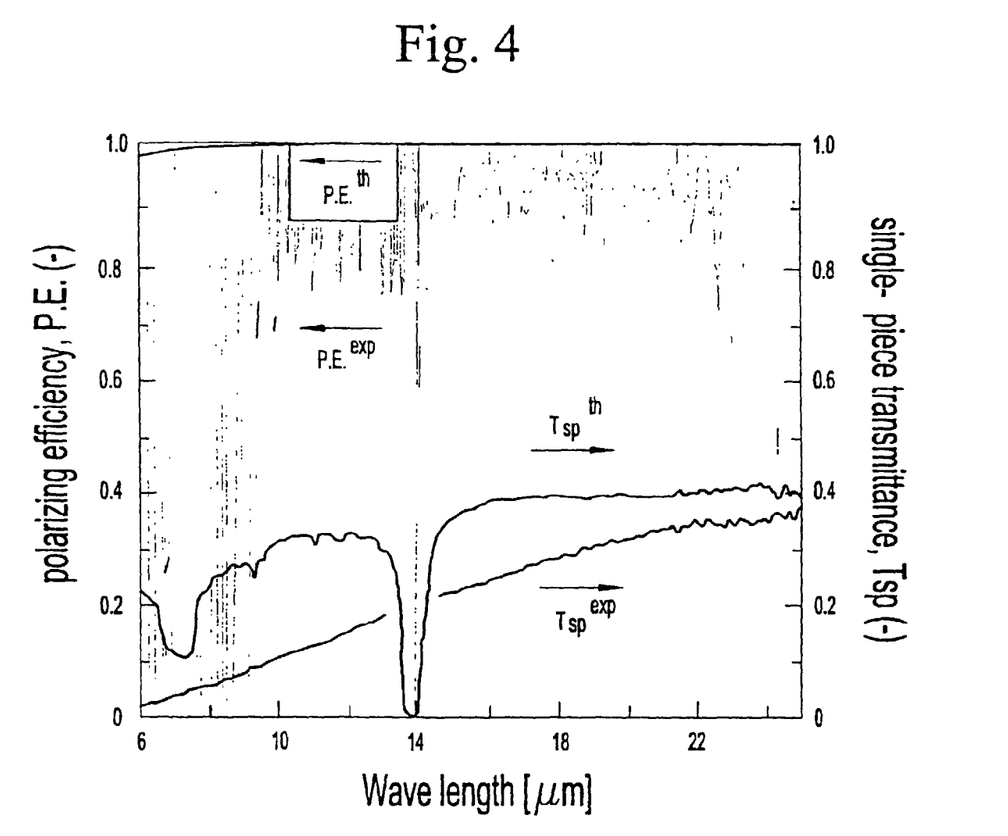
FIG. 4: infrared-spectroscopy measurements showing the capability of a microstructured Aluminum layer onto a high-density polyethylene substrate to polarize light.

Another microstructured object was prepared as described in Example 15. Its optical characteristics was analyzed with a IFS 66V FT-IR spectrometer (Bruker Optik GmbH, Ettlingen, Germany) employing the method proposed by Rupprecht et al. for measuring two identical polarizers (G. Rupprecht, D. M. Ginsberg, J. D. Leslie, *J. Opt Soc. Am.* 52, 665 (1962)). The theoretical limits were calculated according to Auton (J. P. Auton, *Appl. Opt.* 6, 1023 (1967); J. M. Bennett, H. E. Bennett, in Handbook of Optics W. G. Driscoll, W. Vaughan, Eds. (McGraw-Hill, New York, 1978)). It was found that the Al/HDPE system polarized light both the experimental and theoretical polarizing efficiencies are ~1.0 and the single-piece transmittances approach 0.4 (FIG. 4a).

Thus, as this example demonstrates, it is feasible to produce outstanding, efficient light polarizers with the microcutting technique described in one embodiment of this invention.

Examples 35

Another microstructured object was prepared as described in Example 7. Its optical characteristics were analyzed with a Leica DMRX microscope, whereby light incident onto the microcut object was linearly polarized with a dichroic filter. It was found that this Au/PVA system displayed pronounced polarization-dependent colors; i.e., it appeared red or green when examined with the microcut Au grooves perpendicular, respectively parallel to the polarization direction of the incident light.

Thus, as this example demonstrates, it is feasible to produce polarization-dependent color filters with the microcutting technique described in one embodiment of this invention.

Examples 36-38

Figure 5:
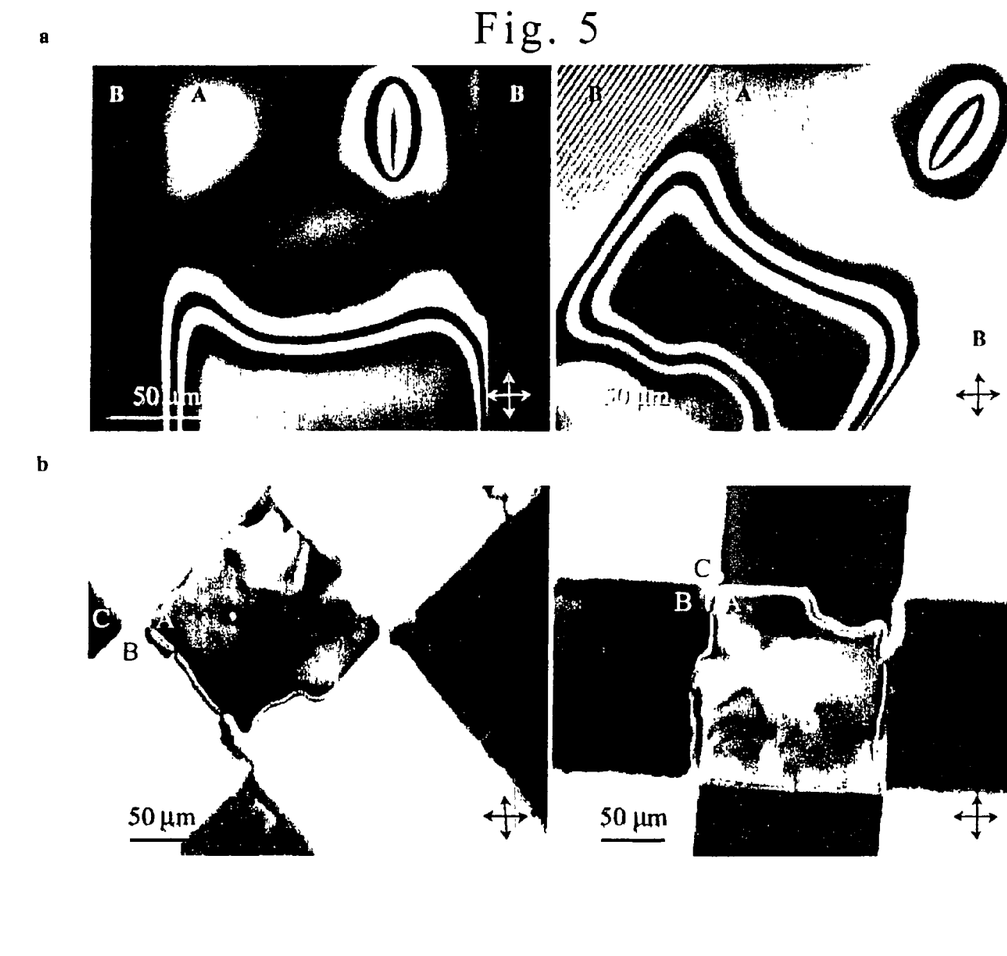
FIG. 5 optical micrographs taken between crossed polarizers illustrating the capability of microstructured objects according to one embodiment of the present invention to align liquid-crystal compounds.

Other microstructured objects were prepared as described in Examples 18, 23 and 25. Subsequently, the liquid-crystal (LC) compound 4'-pentyl-4-biphenylcarbonitrile (Aldrich Chemical Company, Milwaukee, USA) was applied with a disposable micropipette onto these microstructured objects (PEDOT/PMMA: Example 36; 20 nm ITO/PET: Example 37; 20 nm ITO/PET, double-structured: Example 38). All three objects were aligning the LC compound as the optical micrographs (taken between crossed polarizers; Leica DMRX microscope) presented in FIG. 5 illustrate (arrows in indicate position of the polarizer/analyzer). On the unstructured region (A in the presented micrographs), the LC compound was unoriented. For all single structure areas (B), transmitted-light-intensity minima were observed when the sample was positioned with grooves parallel to one of the crossed polarizers (left) and maximum intensities were found at a 45°-position (right), which indicates that the LC molecules are aligned either parallel or perpendicular to the grooves. Remarkably, in the doubly-structured region C, the optical appearance was opposite from that of the single-structured areas: transmitted-light-intensity minima were observed when the sample was positioned with at a 45°-position and maximum intensities were found with grooves parallel to one of the crossed polarizers.

Thus, as these three examples demonstrate, it is feasible to produce LC-alignment layers with the microcutting technique described in one embodiment of this invention.

Having described specific embodiments of the present invention, it will be understood that many modifications thereof will readily be apparent to those skilled in the art, and it is intended therefore that this invention is limited only by the spirit and scope of the following claims.

What is claimed is:

1. A process of forming an array of microelectrodes comprising:
    pressing a master into a multi-layered structure,
    said master having a surface facing said multi-layered structure, said surface comprising an area having a protruding micro-structured pattern comprising tapered features defining protruding edges,
    said multi-layered structure comprising at least one supporting layer that entirely remains in the solid state during pressing, and formed directly on said supporting layer, and positioned between said master and said at least one supporting layer, a metal layer,
    wherein at least said edges of said tapered features of said micro-structured pattern penetrate through said metal layer into said at least one supporting layer, so as to form an array of microelectrodes.

* * * * *